July 15, 1958   G. S. HUNTER ET AL   2,843,079
ILLUMINATION OF POINTERS AND DIALS OF
INDICATING INSTRUMENTS
Original Filed Oct. 16, 1951   3 Sheets-Sheet 3

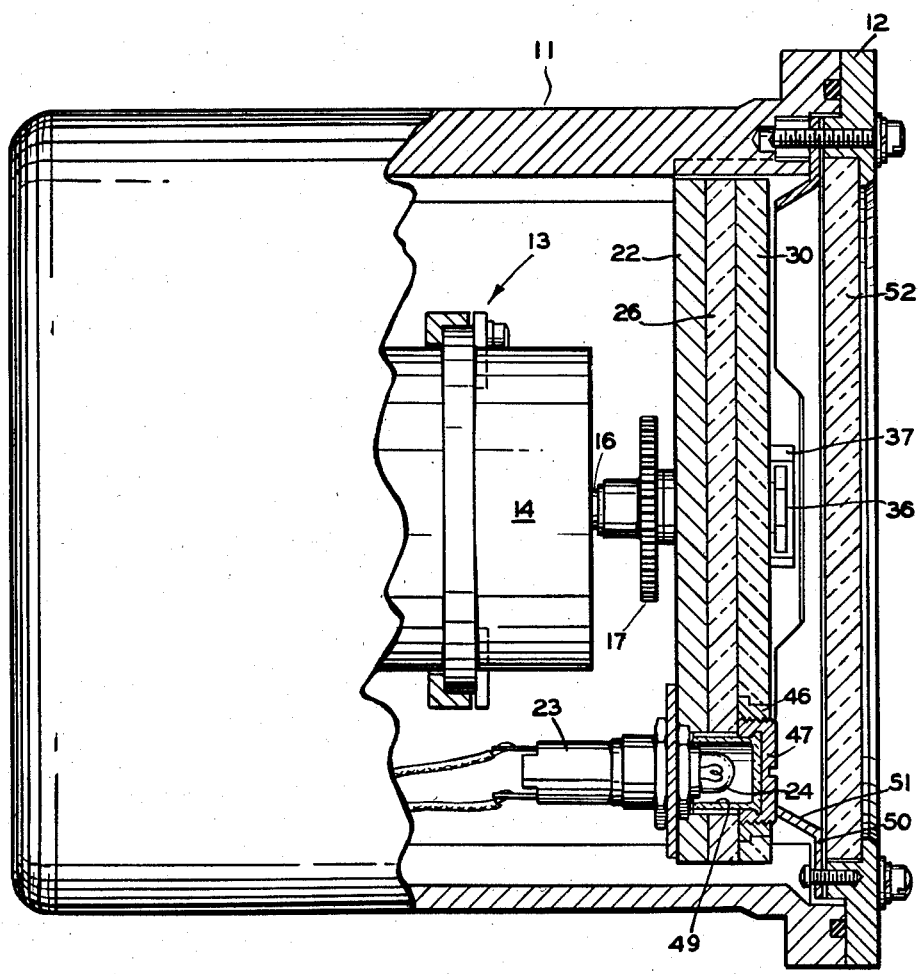

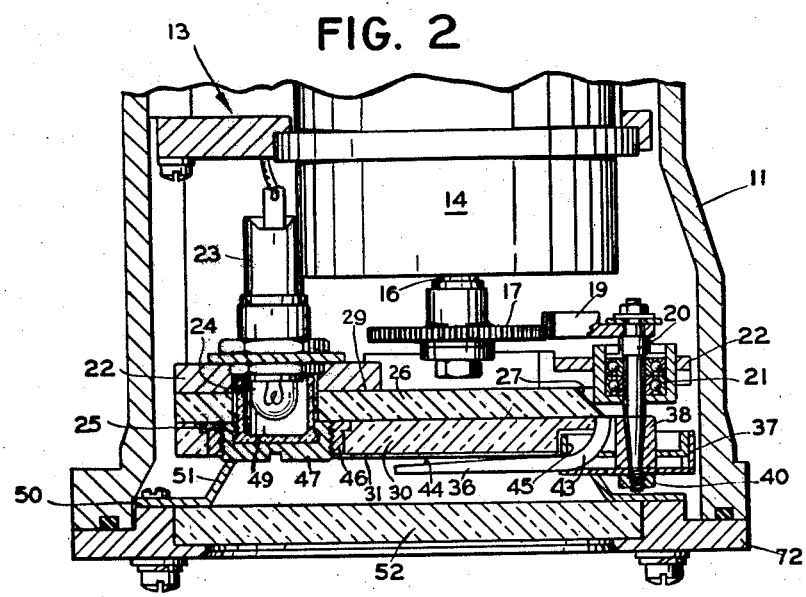
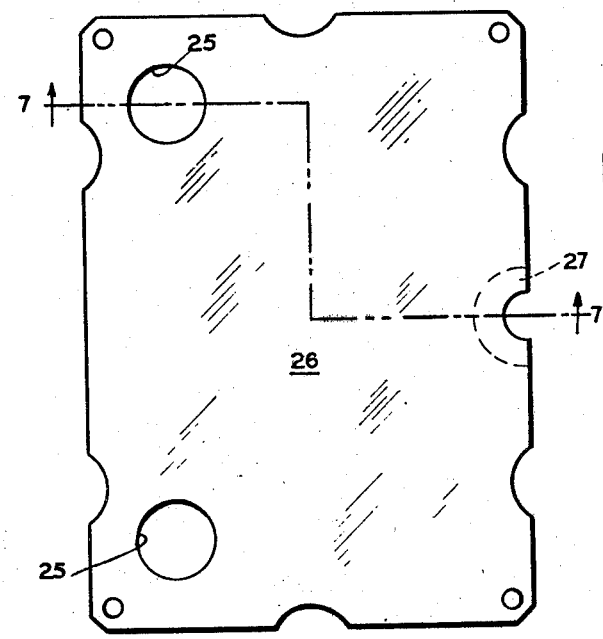
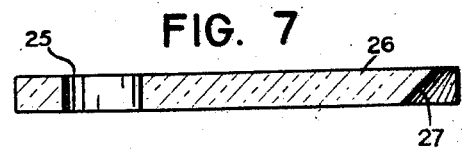

INVENTORS
*GORDON S. HUNTER*
*GEORGE C. STURGES*
BY *Tyler & Roundy*
ATTORNEY

United States Patent Office 2,843,079
Patented July 15, 1958

2,843,079

ILLUMINATION OF POINTERS AND DIALS OF INDICATING INSTRUMENTS

Gordon S. Hunter, Plainville, Conn., and George C. Sturges, Bergenfield, N. J., assignors to Bendix Aviation Corporation, Teterboro, N. J., a corporation of Delaware Continuation of application Serial No. 251,614, October 16, 1951. This application March 16, 1956, Serial No. 572,158

4 Claims. (Cl. 116—129)

This invention in general relates to indicating instruments and in particular to the illumination of the pointers and the dials of such instruments.

Previously in devices of this nature the position of the pointer against the dial was noted by silhouette, that is, the non-illuminated pointer would eclipse the illuminated dial indicia and could thereby be located. An obvious disadvantage of this arrangement is that the occulted indicia are not easily seen. On the other hand, with instruments in which the moving pointer is illuminated, the problem arises in piping the illumination into the moving pointer and in the provision of a uniform illumination intensity within the pointer.

The present invention therefore, contemplates an indicating instrument wherein novel means are provided for effectively illuminating a dial and a movable light-conducting pointer. In order to utilize the light rays from a source of illumination for illuminating the light-conducting pointer and the indicia without a decrease in intensity thereof, a light transmitting plate having a portion of its surface coated with translucent paint is positioned adjacent a dial having engraved indicia. The painted surface of the plate acts as a diffuser of light to direct light rays into the dial so as to illuminate the indicia. One edge of the plate is provided with an arcuate and beveled surface which reflects light rays, transmitted through the plate from the source of illumination, into the bent portion of a movable pointer made of colorless transparent material. The underside of the pointer is painted with a light diffusing substance to simulate the object being positioned and indicated, and only this painted area and the indicia on the dial are visible to an observer under "night-vision" conditions.

An object of the present invention, therefore, is to provide novel means for effectively piping illumination into a movable pointer of an indicating instrument.

Another object is to provide novel means for illuminating the indicia of a dial by employing the light diffusing surface of a light transmitting plate so as to utilize the radiant energy of the rays diffused without a large diminution in intensity.

A further object is to provide a light transmitting plate which functions to illuminate the indicia of a dial and also serves to "pipe" light rays into a movable pointer.

Still another object is the provision of a light transmitting plate having a beveled surface formed at one edge which is located adjacent a bend in a movable pointer whereby high intensity illumination of the pointer is effected by piping of light rays into the pointer by the beveled surface.

A further object is to provide novel means for illuminating the dial and pointers of indicating instruments.

The above and other objects and advantages of the present invention will appear more fully hereinafter from a consideration of the detailed description which follows taken together with the accompanying drawings wherein one embodiment of the invention is illustrated.

In the drawings, wherein like reference characters refer to like parts throughout the several views;

Fig. 1 is a side elevational view, partly in section, of one form of an indicating instrument embodying the present invention;

Fig. 2 is a top plan view, in section, of the indicating instrument of Fig. 1 and showing in more detail the dial and pointer structure;

Fig. 6 is a top plan view of the light transmitting plate of the present invention; and Fig. 7 is a section taken along line 7—7 of Fig. 6.

Figure 3:
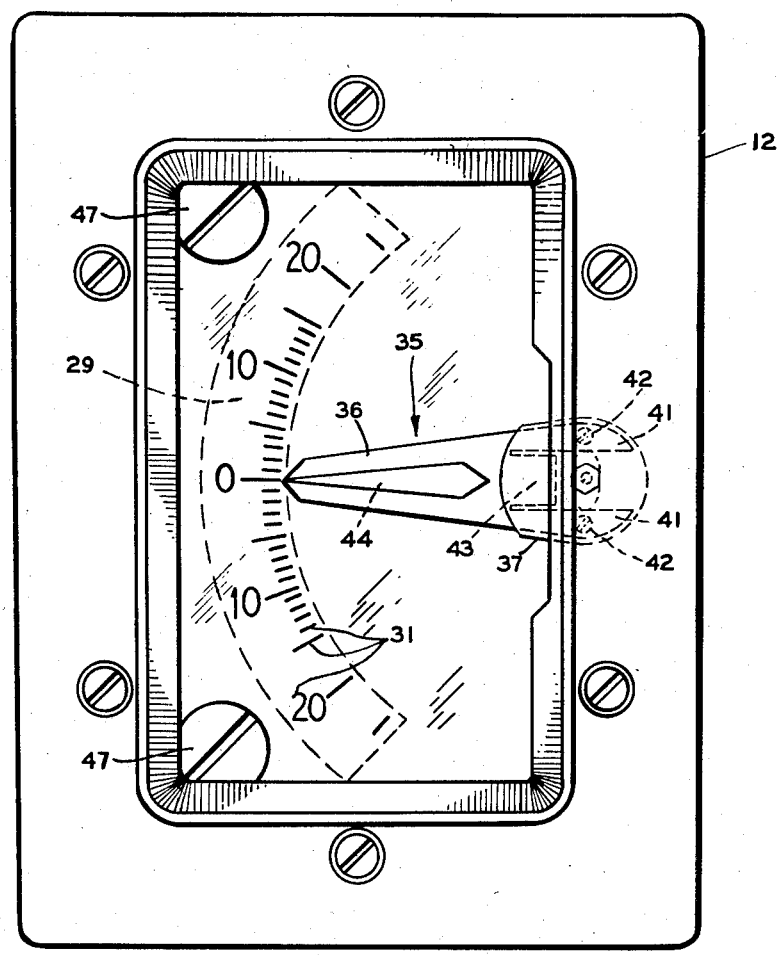
Fig. 3 is a front elevational view of the indicating instrument of Fig. 1 and shows in particular the dial face and front of the pointer.

A problem arising with known types of illuminated instrument dial and pointer arrangements has been the inadequacy of proper illumination of the indicia on the dial and the pointer due to diminution in intensity of the light rays before the latter reach the surfaces to be illuminated. Frequently, these devices employed light transmitting rods mounted in juxtaposition with a dial having engraved indicia and both were edge-lighted from the same source of illumination, the indicia being illuminated by light rays striking the engraved contours thereof while light rays entering the rods were internally reflected and transmitted therethrough to illuminate a movable pointer. The difficulty with such arrangements is that the light rays entering the dial are not totally reflected therein but rather they are partially refracted at the surfaces of the dial thereby resulting in light rays of diminished intensity reaching the indicia. Of course, this is unsatisfactory where the compartment in which the instrument is located is completely "blacked-out."

In the general form of the invention the indicating instrument is usually arranged upon an instrument board and comprises a signal receiver connected to a signal transmitter which is actuated by the movement of an object, the position of which is to be reproduced and indicated by the instrument. It will be apparent that the instrument embodying the present invention does not necessarily have to be a position indicator but may indicate any condition whatsoever.

Referring now more particularly to the drawings for a detailed description of one embodiment of the invention, Fig. 1 illustrates, by way of example, a position indicator having a substantially rectangular casing 11 and a front cover 12. Mounted with casing 11 by suitable supporting means generally designated by numeral 13, parts of which are shown in Figs. 1 and 2, is a signal receiver 14 electrically connected to a signal transmitter (not shown) whereby signals developed at the transmitter serve to angularly displace rotor shaft 16 of receiver 14. A pinion 17 is secured to the forward end of shaft 16 and is adapted for meshing engagement with a sector gear 19 (Fig. 2) mounted on a relatively short shaft 20 suitably journalled for rotation in bearings 21 retained in a supporting member 22.

Supporting member 22 is provided with a pair of openings which accommodate a pair of light sockets 23 and lamps 24, one of the sockets and lamps only being shown in Figs. 1 and 2. Coincident with the openings in member 22 are a pair of openings 25 formed in a rectangular-shaped light transmitting plate 26 (Fig. 6) which is secured back to back with member 22 by screws (not shown). Plate 26 is made of a colorless transparent material such as an acrylic resin highly polished on all sides and has formed at one edge thereof an arcuate 45° bevel 27 (Fig. 7) which is located as to be concentric with short shaft 20 (Fig. 2). Light from lamps 24 will therefore be transmitted through the body of plate 26 and reflected externally of the plate by bevel 27. A portion 29 of the surface of plate 26 which contacts member 22 is provided with a translucent coating such as white paint (the thickness of which is exaggerated in Fig. 4), the painted portion taking the form shown in broken lines in Fig. 3. The translucent coating serves to intercept part of the light rays transmitted through the body of plate 26, and in addition, reflects them toward the opposite surface of the plate immediately above the painted portion so that rays pass out through the surface and into the dial and through the indicia to illuminate the indicia.

A dial 30, made of colorless transparent material such as acrylic resin, is located adjacent to and in front of plate 26 and may be secured to the face of plate 26 by screws (not shown) and is provided with indicia 31 such as graduations and numerals distributed in the arc of a circle, such indicia being rendered capable of illumination by rendering the background opaque and the indicia translucent so as to be illuminated by light directed into the body of the dial. The face of the dial is engraved and then uniformly sprayed with a translucent coating. A coating of black paint or printer's ink is then applied to the face of the dial by rolling in order to avoid coating the engraved indicia. The area containing or covered by indicia 31 is substantially equal to the area covered by painted portion 29 on plate 26, and the latter is directly behind the indicia. In this manner, the light rays reflected by portion 29 transmitted externally of plate 26 enter the body of dial 30 to illuminate indicia 31 with light rays of substantially high intensity. Since lamps 24 are located relatively close to painted portion 29, very little diminution in intensity of the light rays is effected inasmuch as the rays do not travel far before being intercepted by the painted portion.

Figure 4:
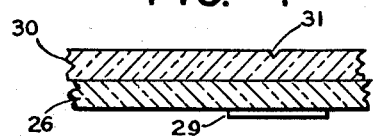
Fig. 4 is a diagrammatical representation of a portion of the light transmitting plate and the dial showing in particular the location of the light diffusing painted area on the plate with respect to the indicia carried by the dial.
Figure 5:
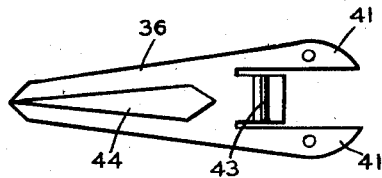
Fig. 5 is a view of the underside of the movable pointer.

Movable relative to dial 30 is an indicator assembly 35 which comprises an indicator or pointer 36, of the same material as plate 26 and dial 30, having highly polished surfaces. Pointer 36 has fastened at its bifurcated end a glare shield cover 37 which in turn is secured to short shaft 20 by sleeve 38 and nut 40 (Fig. 2). Shield 37 is fastened to two legs 41 (Fig. 5) forming part of the bifurcated end of pointer 36, by screws 42 (Fig. 3). Pointer 36, at its inner end, also has an inwardly bent portion 43 which passes intermediate legs 41 and terminates immediately adjacent bevel 27 of plate 26, the sloping surface of the bevel facing away from the bent portion. Part of the underside of the pointer is coated with translucent paint 44 and simulates the control surface of a mobile craft. Thus, when pointer 36 is angularly displaced from zero the observer will be able to visualize the actual position of the control surface in relation to the craft and the amount of displacement from a zero or normally centered position. Dial 30 is formed adjacent shield 37 such that clearance is provided between the dial and a wall 45 of the shield when it rotates with shaft 20, the shield itself serving to prevent stray light from the bevel of plate 26 from entering the eyes of an observer. The positional relationship between bevel 27 and bent portion 43 of pointer 36 provides for reflection of light rays, striking the bevel, externally of plate 26 and into the pointer to illuminate the latter. Under "blacked-out conditions," only the coated portion of pointer 36 will be visible to an observer since the pointer is highly polished on all surfaces and only those light rays which strike the coated portion will be reflected into the eyes of an observer. Under "day-light conditions," the coated portion 44 of pointer 36 will be readily seen because the black coating on dial 30 will appear through the transparent portions of the pointer so as to present a black background for coated portion 44.

In order to facilitate the insertion and the removal of lamps 24 there is provided in dial 30 a pair of openings which accommodate internally threaded bushings 46. A pair of caps 47 (Fig. 2) externally threaded for engagement with bushings 46 are provided so that access may be had to the lamps. It has been found in practice that under "blacked-out conditions" instruments which are illuminated with red light are more pleasing to the eye and for that reason a red color screen 49 is secured to the caps to enclose lamps 24 when the caps are fully screwed in. To prevent stray light, which may escape from around the edges of the dial, from reaching the eyes of an observer a bezel 50 is provided which is secured to the back of front cover 12. It is to be noted that a flanged portion 51 of the bezel defines the sides of an opening which is smaller than dial 30. A transparent cover glass 52 is secured to cover 12 for permitting visual access to the dial and for preventing foreign matter from entering inside the casing.

From the foregoing, it is apparent that the present invention provides novel means for illuminating the indicia of a dial and a movable pointer of an indicating instrument without a diminution in intensity of light rays. The utilization of a common light transmitting member or plate for illuminating both the indicia and the pointer effects an efficient and compact lighting arrangement which provides for high intensity illumination. This application is a continuation-in-whole of our copending application Serial No. 251,614, filed October 16, 1951.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. In an indicating device, a dial having an opaque portion with light-conducting indicia therein, an indicator of light-conducting material cooperating with said dial, a source of illumination, and a light transmitting member adapted to receive light rays from said source of illumination, said member having a first portion adapted to direct light rays received from said source directly from said member into said dial and through said light conducting indicia to illuminate said indicia and a second portion for directing other light rays received from said source into said indicator to illuminate the indicator.

2. In an indicating device, a dial having a body portion and an opaque portion with light-conducting indicia therein, a transparent indicator movable relative to the indicia and having a curved integral light-conducting bend portion extending toward the back of said dial, a light-transmitting member mounted behind said dial to receive light from a light source and having the characteristic of piping light therethrough, and a light-reflecting curved surface formed on said member adjacent said indicator for transmitting into said bend portion of the indicator substantially the same quantity of light for each position of said indicator to illuminate said indicator, said member having light diffusing means for intercepting and directing other light rays externally of said member into the body portion of the dial for illuminating said indicia.

3. In an indicating device, a dial having indicia thereon, a source of illumination, a light-conducting member disposed behind said dial and receiving light rays from said source of illumination, said member having a curved integral beveled surface for reflecting received light rays externally of said member, a movable indicator of light-conducting material disposed in front of said dial to cooperate with said indicia, said indicator having a light-conducting curved portion extending toward the rear of said dial and terminating adjacent said beveled surface for receiving at each position of said indicator substantially the same quantity of light rays reflected from said beveled surface to illuminate said indicator.

4. In an indicating device, a dial having indicia thereon, a light-conducting plate disposed behind said dial, light source means for passing light into said plate in directions generally parallel to the front and back surfaces of said plate so that light is transmitted through said plate by multiple internal reflections, said plate having an arcuate beveled surface extending between the front and back surfaces of the plate for reflecting part of the light transmitted therein out through the front of the plate in a generally arcuate field of distribution, and a light-conducting indicator mounted for rotation in front of said dial to cooperate with said indicia, said indicator having a light-conducting curved portion extending toward the rear of the dial and having the end of said curved portion adapted to rotate in an arcuate path in front of said plate adjacent said surface in said field of distribution to receive the light reflected from said surface, whereby said indicator receives substantially uniform illumination at its various angular portions of rotation.

References Cited in the file of this patent

UNITED STATES PATENTS

| 2,278,520 | Klein | Apr. 7, 1942 |
| 2,287,605 | Dickson | June 23, 1942 |

FOREIGN PATENTS

| 214,644 | Switzerland | Aug. 1, 1941 |
| 730,231 | Great Britain | May 18, 1955 |

UNITED STATES PATENT OFFICE
CERTIFICATE OF CORRECTION

Patent No. 2,843,079                          July 15, 1958

Gordon S. Hunter et al.

It is hereby certified that error appears in the printed specification of the above numbered patent requiring correction and that the said Letters Patent should read as corrected below.

Column 6, line 6, for "portions" read --positions--.

Signed and sealed this 7th day of October 1958.

(SEAL)

Attest:

KARL H. AXLINE

Attesting Officer

ROBERT C. WATSON
Commissioner of Patents